Aug. 4, 1936.  R. E. CONRAD  2,049,640
COTTON HARVESTING, CLEANING, AND HULLING MACHINE
Filed Oct. 4, 1929  3 Sheets—Sheet 1
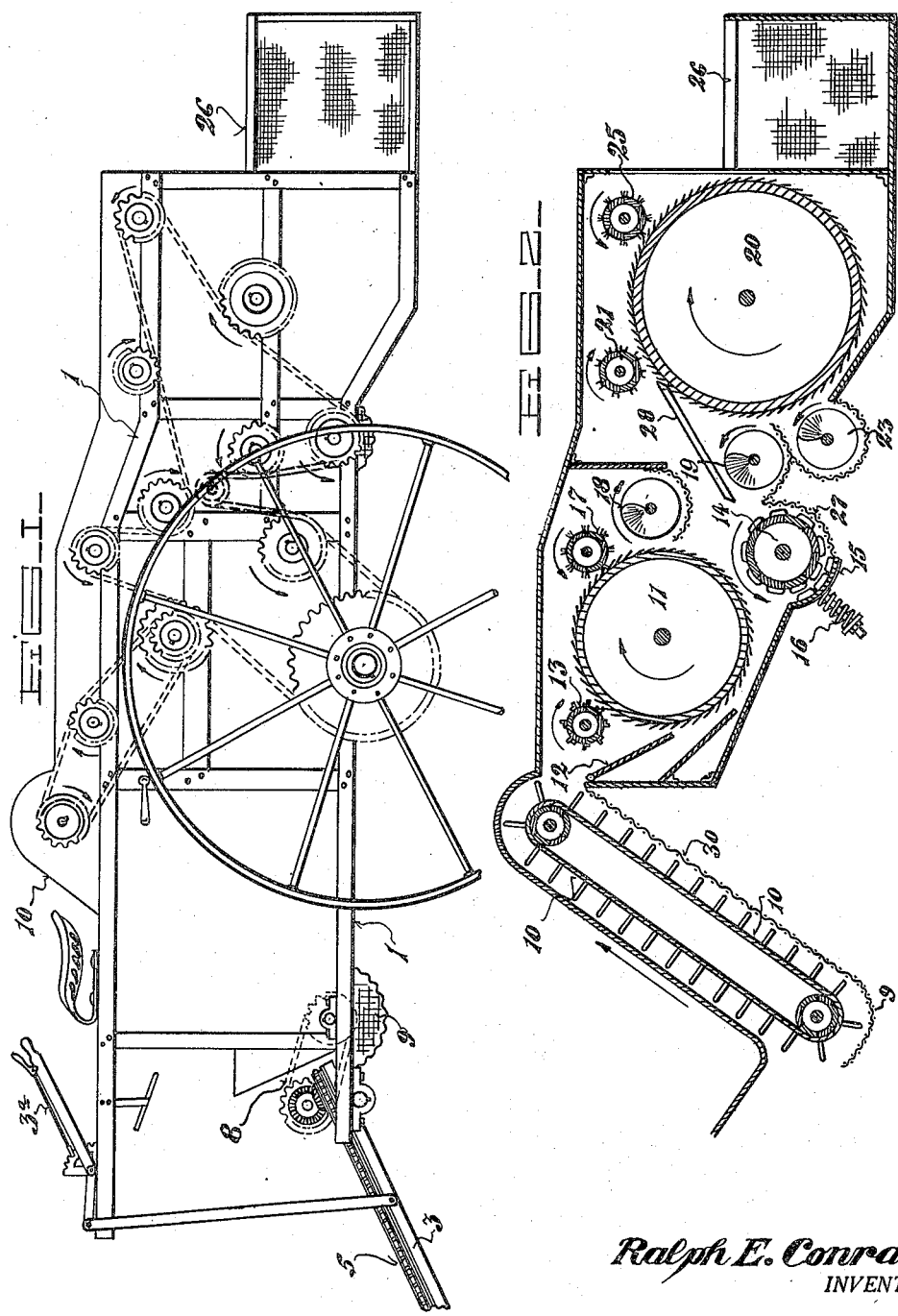
Ralph E. Conrad
INVENTOR.
BY Ernest G. Hood
ATTORNEYS.

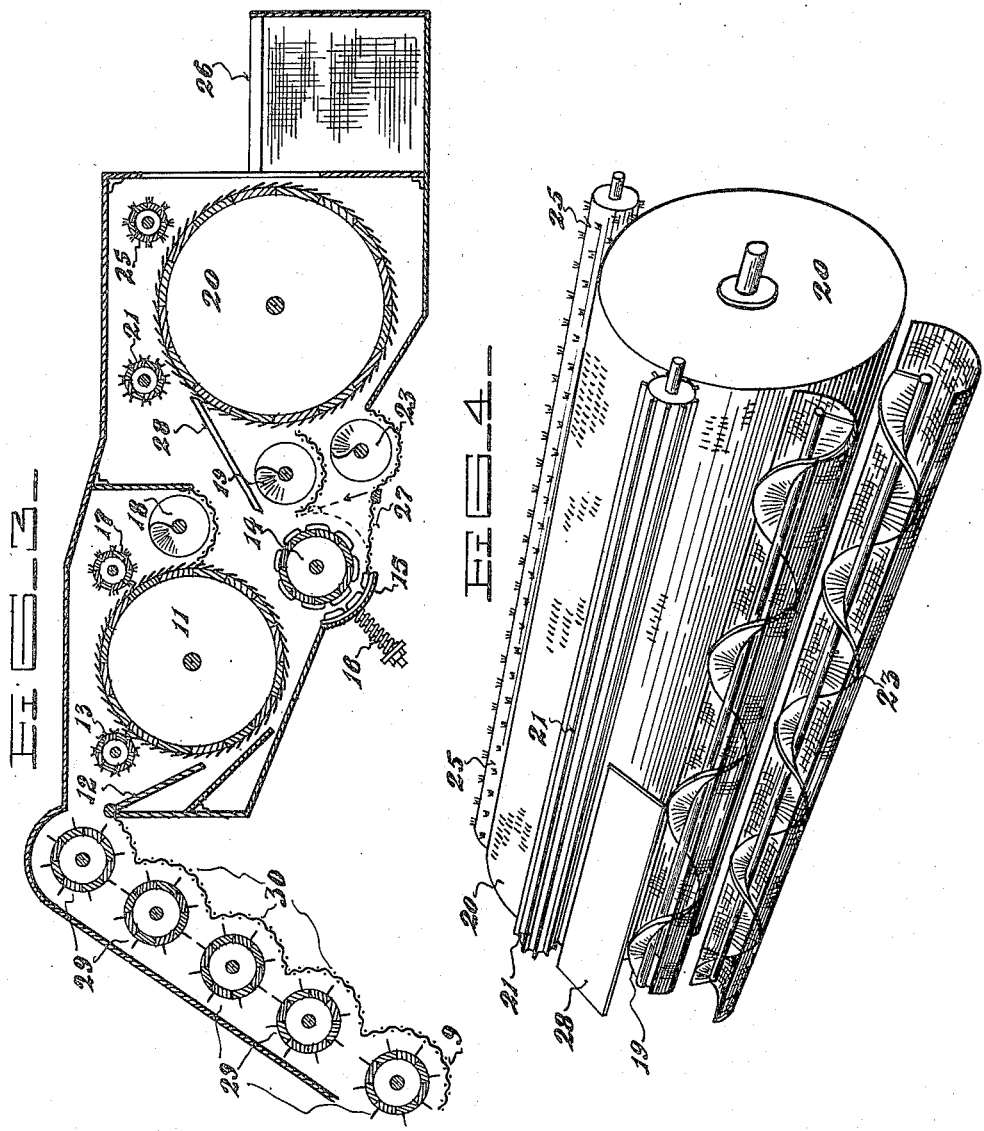

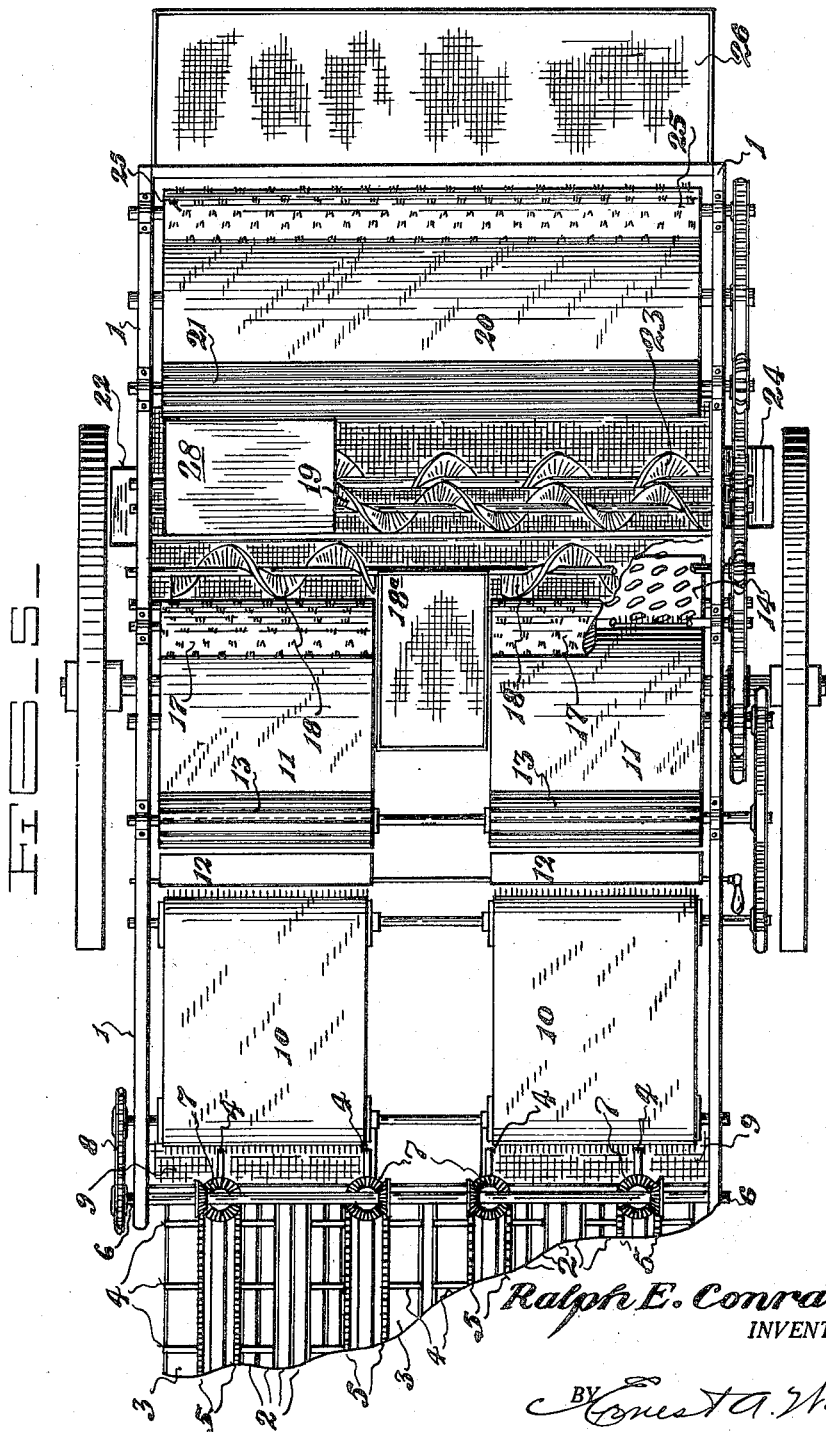

Patented Aug. 4, 1936

2,049,640

UNITED STATES PATENT OFFICE 2,049,640

COTTON HARVESTING, CLEANING, AND HULLING MACHINE

Ralph E. Conrad, Longview, Tex.

Application October 4, 1929, Serial No. 397,199

2 Claims. (Cl. 19—36)

This invention relates to cotton harvesters and cleaning machines and particularly to the type of machine adapted to strip the bolls from the stalks without regard to their various stages of maturity, separating the burrs, stems and trash from the cotton and processing it through a series of cleaning actions preliminary to ginning, and its principal object resides in the provision of a machine calculated to gather the cotton, without discrimination as to whether or not the bolls have all attained maturity, separate the cotton obtained from the open, mature bolls from that obtained from the unopened and immature bolls, and divest it of the trash, burrs and stems, so as to maintain a maximum grade of seed cotton ordinarily attained only through manual picking.

The invention further comprehends the provision of a machine which is capable of first cleaning the mature cotton, separating it from the immature cotton, conveying it to a special container, then processing and cleaning the immature cotton, that is to say, the cotton removed from immature or unopened bolls, by removing the burrs and trash from its fibers and conveying it to a container placed apart from that of the mature cotton which is taken from the open or mature bolls. The cotton which is removed from the immature bolls, of course, being of a lower grade, due to the usually yellowish or stained appearance, cannot be economically mixed with the locks of mature, white cotton.

While the foregoing are the most important of the several objects, the invention further comprehends the provision of a machine which, due to its novel arrangement of cleaning devices, eliminates much of the necessary cleaning operations required in ginneries where the rough, indiscriminate methods of cotton gathering are used, producing, as a result, a higher grade of ginned cotton than ordinarily attained.

With the foregoing objects as paramount, the invention has particular reference to its salient features of construction and operation, by which the foregoing objects are attained and which will become manifest as the description proceeds, taken in connection with the appended drawings, wherein;—

Figure 1 is an elevational view of a suggested wheeled frame, showing the driving arrangement of the various gathering and cleaning devices.

Figure 2 is an axial sectional view of the machine, showing the elevator and impaling drums and the relationship of their respective co-operating elements, and showing their direction of rotation.

Figure 3 is a modified exemplification of Figure 2 showing a series of beater drums and concaves, and showing a modified type of concave adjacent to the boll breaker.

Figure 4 is a perspective view of the rearmost impaling drum and its cooperative elements, showing the flight conveyors and deflector board, and Figure 5 is a plan view of a two row machine, showing all of the operative elements.

The invention, accordingly, comprises primarily, a wheeled frame 1, shown in Figure 1, and while it is shown as the preferred embodiment of a frame construction for the present invention, the same may be altered to conform to the arrangement of the elements of the invention calculated to obtain the best results.

The prime object of the invention being that of stripping the cotton, bolls and foliage from the stalks, the latter are impaled between the fingers 2 in the apron 3, as shown in Figure 5, the foliage being stripped from the stalks by the forward movement of the machine and the lugs 4 spaced apart, in series, on sprocket chains 5 which are driven by a shaft 6 through bevel gears 7, as shown in Figure 5, a sprocket chain 8 being provided to drive the shaft 6. The apron 3, as shown in Figure 1, is capable of adjustment with respect to the ground by a lever 3a on the frame 1.

As the material is advanced upward, on the apron 3 by the lugs 4 on the chains 5, it is delivered into foraminous concaves 9 and picked up by the elevator 10 which delivers it into the machine where it is received by the toothed impaling drums 11, being directed against the latter by adjustable slides 12, as shown in Figures 2, 3 and 5.

As the toothed drums 11 are rotating at a high rate of speed in a clockwise direction, the mature cotton is carried upward toward the stripper rollers 13, which rotate in the same direction as the drums 11, to dislodge the burrs, and trash clinging to the material and doff them back upon the adjustable slides 12 whereupon they fall below the drums 11, with the unopened and immature bolls, to be crushed in the boll breakers 14, the latter having a series of projections corresponding to those of adjustable segments 15 held in close relationship with the boll breaker cylinders 14, as shown in Figures 2 and 3, by tension springs 16.

Matured cotton, that is to say, cotton which can be easily removed from a fully opened boll, releases the burrs freely and, consequently, retains only a small amount of clinging burrs and trash when properly handled. This mature cotton, therefore, clings to the impaling drum freely while the unopened bolls pass below the impaling drums 11 and into the boll breakers 14 to be broken up.

As the mature cotton is carried over the drums 11, the doffer brushes 17, acting in a reverse direction to that of the impaling drums 11, doff the material into flight conveyors 18, which having their spirals operating in opposite directions, deliver the cotton into a container 18a situated near the center of the machine, as exemplified in Figure 5.

While the description deals with a two row machine, such as that shown in Figure 5, it is understood that such an arrangement as that shown could be employed in a single row machine by eliminating one of each of the elements above mentioned, and while that part of the machine about to be described, shows the operative elements extending all the way through the machine, as shown in Figures 4 and 5, these elements may be shortened to correspond with the primary elements.

Standing behind the machine, looking in the direction of travel, the material after having been processed by the precleaner cylinders is delivered into its boll breaker 14. The latter, rotating in a counter-clockwise direction over a foraminous surface, as shown in Figure 2, discharges the material into the left hand end of the flight conveyor 19. The material would thus be caused to travel to the right along the face of the secondary impaling drum 20 and hulls will discharge onto the ground through the chute 22 at the right hand end of the conveyor 19.

The material gathered from a row to the right of the machine after having been passed through the boll breaker 14 companion to that serving conveyor 19 enters the right hand end of the conveyor 23, immediately below the conveyor 19 and travels to the left, also along the face of the impaling drum 20 and the hulls and trash will be discharged onto the ground through the chute 24.

It is important to note in Figure 5 that a more thorough separation of hulls and cotton is obtained by virtue of a deflector board 28. Material entering the conveyor 19, as explained, travels to the right in this conveyor and all hulls and burs with clinging locks of cotton will fall back into the conveyor 19 to be again subjected to the impaling action of the drum 20. This impaling and doffing action continues with the locks of cotton with clinging hulls until the deflector board 28 is reached, it being understood that all cotton free from clinging hulls is impaled upon drum 20 almost immediately. However, when the material reaches the deflector board 28, this element directs these hulls and burs into the lower conveyor 23 which conveys the material again along the face of drum 20 in an opposite direction. The material thus directed, together with that initially delivered into conveyor 23, is subjected to the action of the impaling drum 20 and all of the hulls with clinging locks of cotton are doffed from the drum 20 back into the upper conveyor 19 for reprocessing. Hence a dual separation is obtained. The refuse in the most part instead of being dumped onto the ground through chute 22, is discharged through chute 24.

It will be observed in Figure 3 that the beater cylinder 14 is provided with an adjustable foraminous bottom 27 in order that the material may be directed at will into either conveyor 19 or 23, depending on the number of rows of cotton harvested, whether one or two. In a single row machine, material enters the left end of conveyor 19, travels to the right and discharges into the right hand end of the conveyor 23, after which it will be caused to move to the left by conveyor 23 and the refuse will be discharged onto the ground through the chute 24. The chute 22 on the opposite side of the machine will of course, be closed.

A modified type of elevator 10, comprising a series of beater cylinders 29, arranged over a series of concaves 30 in the manner shown in Figure 3 is sometimes desirable in preference to that shown in Figure 2. The material is delivered into the concave 9, in the same manner as that of Figure 2, and is processed progressively upward over the screening surfaces of the concaves 30 and delivered into the machine. Attention is directed, however, to the screening surface, which, for the sake of clarity, will be designated by the numeral 30, is arranged beneath the elevator 10, as shown in Figure 2, to eliminate as much of the trash and dirt as possible before the foliage enters the machine.

Though the invention has been described with great particularity, the details of the embodiment of the invention herein shown are not to be construed as being limited thereto, as changes in arrangement and substitution of equivalents may be made by those skilled in the art without departing from the invention as defined in the appended claims.

What is claimed is:

1. In a cotton cleaning and hulling machine, a primary cotton impaling drum, a stripping roll adjacent the upgoing side of said drum, a doffing brush adjacent the downgoing side of the said impaling drum, a foraminous concave and a conveyor therein for discharging cotton doffed from said primary impaling drum, a decline below said primary impaling drum, a boll breaking unit at the terminal end of said decline for receiving bolls escaping impalement by said primary impalement drum, a second and larger impaling drum whose axis is parallel with the axis of said primary impaling drum, a foraminous concave for receiving the discharge from said boll breaker and having a conveyor therein extending alongside said second impaling drum whereby to effect impalement of cotton extracted from the bolls by said boll breaker, means for stripping hulls and trash from the cotton impaled upon said second impaling drum, means for deflecting said strippings for re-impalement, means for doffing said second impaling drum and means for receiving material doffed therefrom.

2. A machine of the character described including a primary cotton receiving and impaling drum and a secondary impaling drum mounted rearwardly of said first drum, stripping and doffing means for each of said drums, means for bypassing bolls entrained in the stream of cotton entering said machine, boll breaking means disposed at the discharge end of said bypass, means for transferring broken bolls and cotton from said boll breaking means to said secondary impaling drum, a deflector plate adjacent the upgoing side of said secondary impaling drum to effect re-impalement of material impaled upon said secondary impaling drum and separate means for receiving cotton doffed from said secondary impaling drum.

RALPH E. CONRAD.